(12) United States Patent
Scot et al.

(10) Patent No.: US 12,373,521 B2
(45) Date of Patent: Jul. 29, 2025

(54) SECURE USER AUTHENTICATION USING MACHINE LEARNING AND GEO-LOCATION DATA

(71) Applicant: Bank of America Corporation, Charlotte, NC (US)

(72) Inventors: Richard S. Scot, Huntersville, NC (US); Graham Wyllie, Charlotte, NC (US); Kelly Renee-Drop Keiter, Waxhaw, NC (US); Robert Nyeland Huggins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 275 days.

(21) Appl. No.: 17/873,275

(22) Filed: Jul. 26, 2022

(65) Prior Publication Data
US 2024/0037195 A1 Feb. 1, 2024

(51) Int. Cl.
G06F 21/31 (2013.01)

(52) U.S. Cl.
CPC .................... *G06F 21/31* (2013.01)

(58) Field of Classification Search
None
See application file for complete search history.

(56) References Cited

U.S. PATENT DOCUMENTS

| | | | |
|---|---|---|---|
| 8,843,108 B1 * | 9/2014 | Lish | G06Q 40/02 705/40 |
| 9,391,985 B2 * | 7/2016 | Hefetz | H04M 15/8033 |
| 9,801,058 B2 * | 10/2017 | Tali | H04W 4/021 |
| 9,961,088 B2 * | 5/2018 | Hughes, Jr. | H04W 12/065 |
| 10,212,587 B2 * | 2/2019 | Bentley | G06F 21/34 |
| 10,664,896 B2 * | 5/2020 | Or | G06Q 30/0201 |
| 10,990,971 B2 * | 4/2021 | Lloyd | G06Q 20/4015 |
| 11,257,080 B2 * | 2/2022 | John | G06F 21/6263 |
| 11,403,131 B2 * | 8/2022 | Mohapatra | G06F 9/445 |
| 11,544,716 B2 * | 1/2023 | Martinez-Guarneros | G06Q 20/389 |
| 11,593,823 B2 * | 2/2023 | Buesser | G06N 5/04 |
| 11,875,335 B2 * | 1/2024 | Benkreira | G06N 20/00 |
| 11,995,175 B2 * | 5/2024 | Maiman | G06F 21/45 |
| 2010/0274691 A1 * | 10/2010 | Hammad | G06Q 20/3221 705/30 |
| 2013/0030994 A1 * | 1/2013 | Calman | G06Q 40/00 705/40 |
| 2013/0102283 A1 * | 4/2013 | Lau | G06Q 30/0269 455/411 |

(Continued)

*Primary Examiner* — Backhean Tiv
(74) *Attorney, Agent, or Firm* — Banner & Witcoff, Ltd.

(57) ABSTRACT

Arrangements for providing frictionless unauthorized activity detection and user authentication are provided. In some aspects, user data, such as transaction data may be received and used to train a machine learning model. In some examples, the machine learning model may be executed to generate one or more expected user patterns. In some arrangements, a request for transaction may be received. The request for transaction may include transaction details. In response, the system may request current geo-location data of a user. In some examples, the transaction details and geo-location data may be analyzed (e.g., compared to the expected user patterns) to generate an authentication output. The authentication output may then be transmitted to one or more systems to process the requested transaction, prevent transaction processing, or the like.

21 Claims, 12 Drawing Sheets

(56) References Cited

U.S. PATENT DOCUMENTS

| | | | |
|---|---|---|---|
| 2014/0279503 A1* | 9/2014 | Bertanzetti | G06Q 20/3221 |
| | | | 705/44 |
| 2014/0358661 A1* | 12/2014 | Or | G06Q 30/0226 |
| | | | 705/14.27 |
| 2016/0162896 A1* | 6/2016 | Grigg | H04W 12/04 |
| | | | 705/44 |
| 2017/0091765 A1* | 3/2017 | Lloyd | G06Q 20/321 |
| 2018/0150903 A1* | 5/2018 | Waldron | G06F 3/011 |
| 2019/0108572 A1* | 4/2019 | Or | G06Q 30/0201 |
| 2019/0197514 A1* | 6/2019 | Tineo | G06Q 20/4015 |
| 2019/0295088 A1* | 9/2019 | Jia | G06N 5/04 |
| 2019/0378135 A1* | 12/2019 | Lloyd | G06Q 20/4015 |
| 2020/0005295 A1* | 1/2020 | Murphy | G06Q 20/405 |
| 2021/0090084 A1* | 3/2021 | Fisher | G06Q 20/357 |
| 2021/0383391 A1* | 12/2021 | Barry | H04L 67/306 |
| 2022/0101192 A1* | 3/2022 | Patel | G06N 7/01 |
| 2022/0215465 A1* | 7/2022 | Mitchko | G06Q 20/102 |
| 2023/0030389 A1* | 2/2023 | Chaudhary | H04L 63/104 |
| 2023/0035570 A1* | 2/2023 | Edwards | G06N 3/088 |
| 2023/0106289 A1* | 4/2023 | Maiman | G06Q 20/4014 |
| | | | 726/5 |
| 2023/0107703 A1* | 4/2023 | Zhang | G06N 20/00 |
| | | | 705/39 |
| 2023/0162056 A1* | 5/2023 | Poole | G06N 20/20 |
| | | | 706/12 |
| 2023/0273981 A1* | 8/2023 | Rapowitz | G06F 21/31 |
| | | | 726/4 |
| 2024/0029051 A1* | 1/2024 | Sethia | G06Q 20/38215 |
| 2024/0037195 A1* | 2/2024 | Scot | G06F 21/31 |

* cited by examiner

SECURE USER AUTHENTICATION USING MACHINE LEARNING AND GEO-LOCATION DATA

BACKGROUND

Aspects of the disclosure relate to electrical computers, systems, and devices for providing frictionless authentication and unauthorized activity detection using machine learning.

With the volume of transactions processed daily, detection of unauthorized activity and user authentication is an important or even critical part of providing secure functionality to customers. Conventional systems for detecting unauthorized activity are not predictive in that they do not proactively identify expected user transactions and intelligently evaluate transactions to detect unauthorized activity, authenticate a user and/or process a transaction. Accordingly, it would be advantageous to predict user patterns to accurately evaluate requested transactions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with secure, frictionless unauthorized activity detection and user authentication.

In some aspects, user data, such as transaction data may be received and used to train a machine learning model. In some examples, the machine learning model may be executed to generate one or more expected user patterns. In some arrangements, a request for transaction may be received. The request for transaction may include transaction details. In response, the system may request current geo-location data of a user. In some examples, the transaction details and geo-location data may be analyzed (e.g., compared to the expected user patterns) to generate an authentication output. The authentication output may then be transmitted to one or more systems to process the requested transaction, prevent transaction processing, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, detecting unauthorized activity and securely authenticating users is an important aspect of transaction processing. Accordingly, aspects described herein related to using machine learning to predict user patterns and determine whether requested transactions fall within the expected patterns.

For instance, a machine learning model may be trained using, for instance, historical user data. The machine learning model may be executed to generate or output one or more expected user patterns. One or more requests for a transaction may be received. In some examples, current geo-location data of a user computing device may be requested and received. Transaction details of the requested transaction and the geo-location data may be analyzed to determine whether the transaction falls within one or more of the expected user patterns. Based on the analysis, an authentication output may be generated and transmitted to one or more computing devices or systems.

These and various other arrangements will be discussed more fully below.

Figure 1A:
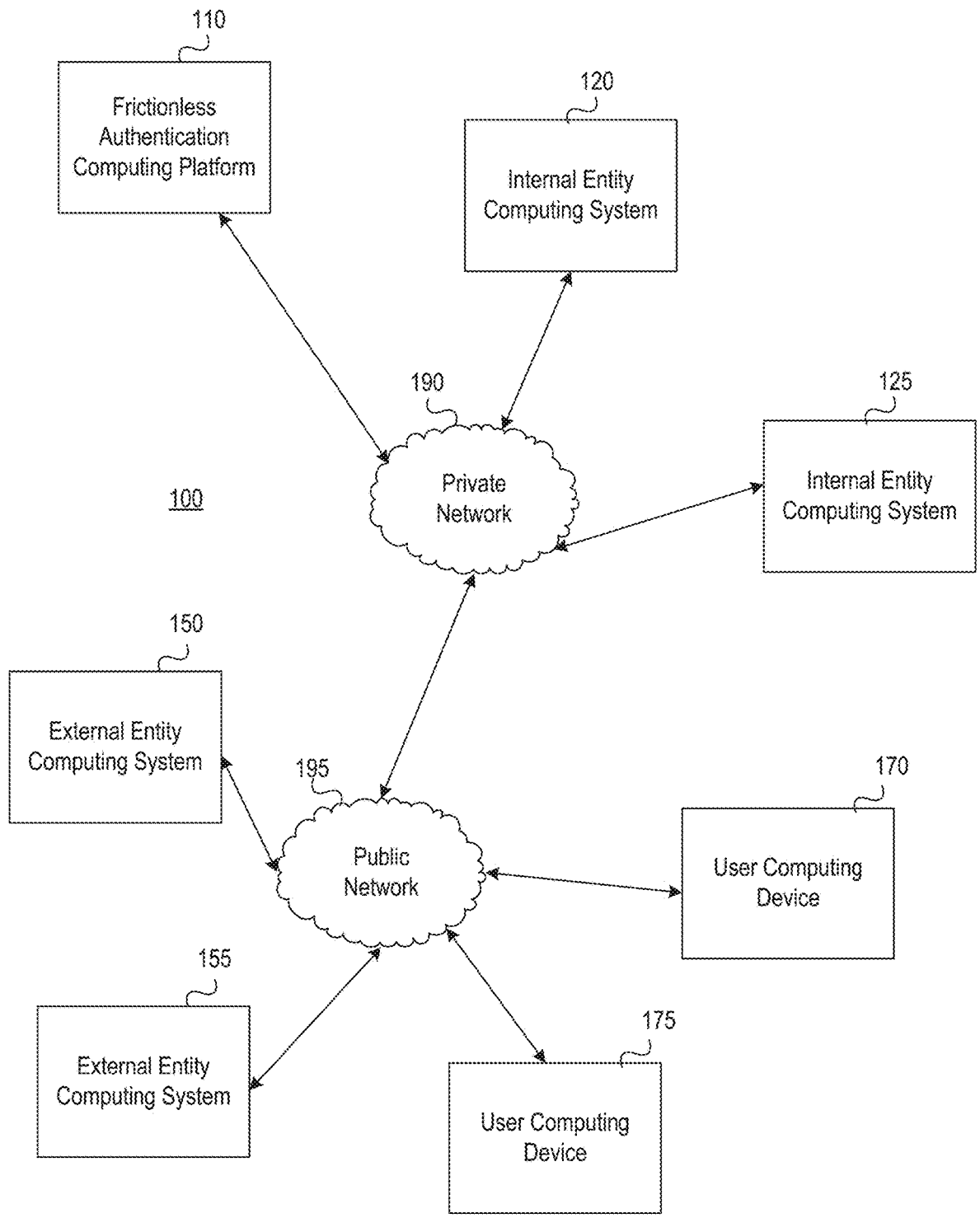
FIGS. 1A and 1B depict an illustrative computing environment for implementing frictionless authentication functions in accordance with one or more aspects described herein.
Figure 1B:
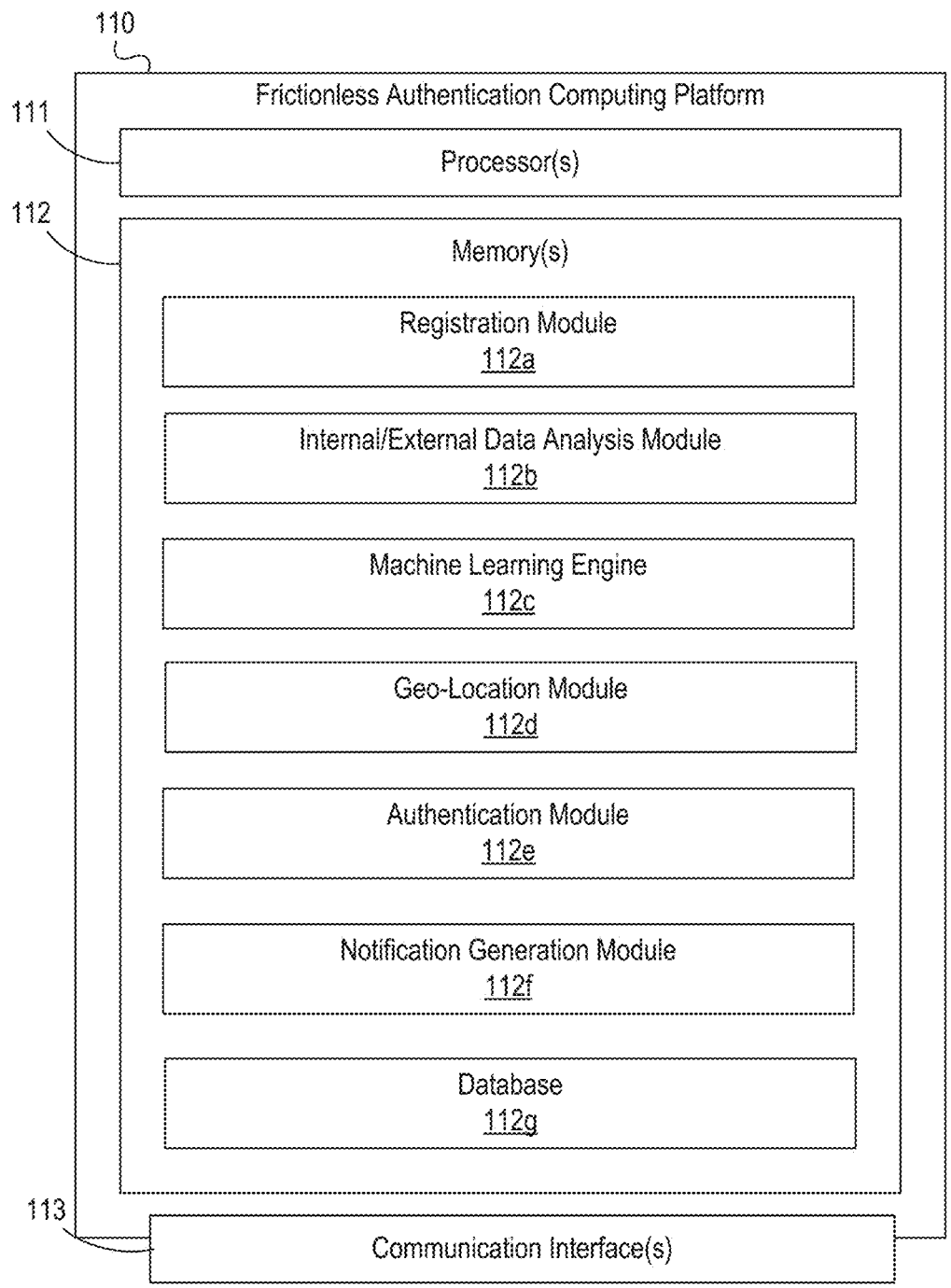

FIGS. 1A-1B depict an illustrative computing environment for implementing and using frictionless authentication in accordance with one or more aspects described herein. Referring to FIG. 1A, computing environment 100 may include one or more computing devices and/or other computing systems. For example, computing environment 100 may include frictionless authentication computing platform 110, internal entity computing system 120, internal entity computing system 125, external entity computing system 150, external entity computing system 155, user computing device 170, and user computing device 175. Although two internal entity computing systems 120, 125, two external entity computing system 150, 155 and two user devices 170, 175 are shown, more or fewer devices or systems may be used without departing from the invention.

Frictionless authentication computing platform 110 may be configured to provide intelligent, dynamic, frictionless authentication functions based on, in some examples, geo-location data of a user or user device in real-time or near real-time. For instance, frictionless authentication computing platform 110 use a machine learning model to predict user patterns and determine, based on current transaction data and geo-location data, whether a requested transaction matches or falls within the expected pattern to authenticate a user, determine whether unauthorized activity is occurring, authorize a transaction, and the like, with minimal or no input from the user (e.g., without a user providing authentication credentials, or the like). For instance, frictionless authentication computing platform 110 may receive data from various sources. For instance, transaction data associated with previously processed transactions (e.g., type of transaction, entities or merchants involved, location, items purchased, and the like). In some examples, data may be received from internal data sources (e.g., internal to an enterprise organization implementing the frictionless authentication computing platform 110), such as internal entity computing system 120, internal entity computing system 125, and the like, and/or external data sources (e.g., sources external to the enterprise organization), such as external entity computing system 150, external entity computing system 155, and the like.

The received data may be used to train a machine learning model hosted by the frictionless authentication computing platform 110. For instance, the machine learning model may be trained using supervised or unsupervised learning to generate one or more expected user patterns for a particular user. For instance, previous transaction data may be used to train the machine learning model based on data indicating a date of a transaction, a merchant or vendor associated with the transaction, an amount of the transaction, an account with which the transaction was made, and the like. The machine learning model may identify patterns or sequences of data associated with a user to generate one or more expected user patterns.

Upon receiving a request to process a transaction, frictionless authentication computing platform may receive transaction details, as well as current location data of a user (e.g., geo-location data retrieved from a user computing device 170). This information may be compared to expected user patterns to determine whether unauthorized activity is occurring, whether the user should be authenticated and/or the transaction processed, and the like.

The subsequent transaction data may then be used to update or validate the machine learning model, to improve accuracy, enable continuous learning of the model, and the like.

Internal entity computing system 120 and/or internal entity computing system 125 may be or include one or more computing devices (e.g., servers, server blades, or the like) having one or more computer components (e.g., memories, processors, and the like) and may be configured to host or execute one or more applications of the enterprise organization. For instance, internal entity computing system 120 and/or internal entity computing system 125 may host one or more applications for processing payments (e.g., via a user financial institution account), making purchases via a credit card, updating account ledgers, or the like. Accordingly, data associated with a plurality of transactions of a plurality of users may be captured by internal entity computing system 120 and/or internal entity computing system 125 and used to train the machine learning model, identify user patterns, and the like.

External entity computing system 150 and/or external entity computing system 155 may be or include one or more computing devices (e.g., servers, server blades, or the like) having one or more computing components (e.g., processors, memories and the like) and may be configured to process user transactions. For instance, external entity computing system 150 and/or external entity computing system 155 may include systems configured to process credit card transactions associated with other credit card providers, may be merchant systems such as point-of-sale systems to process transactions, may host a merchant website configured for online purchases, or the like. Data captured by external entity computing system 150 and/or external entity computing system 155 may be used to train the machine learning model, identify user patterns, or the like.

User computing device 170 and/or user computing device 175 may be or include one or more computing devices associated with a user (e.g., a user registered with the system or customer of the enterprise organization requesting frictionless authentication). User computing device 170 and/or user computing device 175 may include a smartphone, smart watch or other wearable device, laptop computer, desktop computer, tablet device, or the like. User computing device 170, 175 may be a pre-registered device configured to capture user data and transmit user or device data to frictionless authentication computing platform as requested or on a continuous or periodic basis. User computing device 170 and/or user computing device 175 may include a global positioning system (GPS) or other system to capture geo-location data of a user (e.g., current geo-location data, previous geo-location data, and the like) of a user (e.g., with permission of the user) to verify that a requested transaction falls within an expected user pattern.

As mentioned above, computing environment 100 also may include one or more networks, which may interconnect one or more of frictionless authentication computing platform 110, internal entity computing system 120, internal entity computing system 125, external entity computing system 150, external entity computing system 155, user computing device 170, and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, frictionless authentication computing platform 110, internal entity computing system 120, and/or internal entity computing system 125, may be associated with an organization (e.g., a financial institution), and private network 190 may be associated with and/or operated by the organization, and may include one or more networks (e.g., LANs, WANs, virtual private networks (VPNs), or the like) that interconnect frictionless authentication computing platform 110, internal entity computing system 120, and/or internal entity computing system 125, and one or more other computing devices and/or computer systems that are used by, operated by, and/or otherwise associated with the organization. Public network 195 may connect private network 190 and/or one or more computing devices connected thereto (e.g., frictionless authentication computing platform 110, internal entity computing system 120, and/or internal entity computing system 125) with one or more networks and/or computing devices that are not associated with the organization. For example, external entity computing system 150, external entity computing system 155, user computing device 170, and/or user computing device 175, might not be associated with an organization that operates private network 190 (e.g., because external entity computing system 150, external entity computing system 155, user computing device 170, and/or user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, external entity computing system 155, user computing device 170, and/or user computing device 175, to private network 190 and/or one or more computing devices connected thereto (e.g., frictionless authentication computing platform 110, internal entity computing system 120, internal entity computing system 125).

Referring to FIG. 1B, frictionless authentication computing platform 110 may include one or more processors 111, memory 112, and communication interface 113. A data bus may interconnect processor(s) 111, memory 112, and communication interface 113. Communication interface 113 may be a network interface configured to support communication between frictionless authentication computing platform 110 and one or more networks (e.g., private network 190, public network 195, or the like). Memory 112 may include one or more program modules having instructions that when executed by processor(s) 111 cause frictionless authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of frictionless authentication computing platform 110 and/or by different computing devices that may form and/or otherwise make up frictionless authentication computing platform 110.

For example, memory 112 may have, store and/or include a registration module 112a. Registration module 112a may store instructions and/or data that may cause or enable the frictionless authentication computing platform 110 to receive a user request to register with the system and generate a user record associated with the user. In some examples, the registration data received and/or user record may include a user identifier, account identifier, device identifier, or the like. In some examples, the user request for registration may include one or more permissions to capture or receive data from various entities (e.g., to be used in a frictionless authentication process), selection of one or more options or settings, or the like.

Frictionless authentication computing platform 110 may further have, store and/or include internal/external data analysis module 112b. Internal/external data analysis module 112b may store instructions and/or data that may cause or enable the frictionless authentication computing platform 110 to receive data from various sources (e.g., internal sources such as internal entity computing system 120, internal entity computing system 125, or the like, and/or external sources such as external entity computing system 150, external entity computing system 155, and the like). The data may include historical transaction data (e.g., including amount, merchant, type of transaction, date, time, location, and the like), as well as current transaction requests, and the like.

The received data may be used to train a machine learning model hosted by machine learning engine 112c. For instance, the historical transaction data may be used to train one or more machine learning models using, for instance, supervised learning techniques, unsupervised learning techniques, or the like. In some examples, labeled datasets indicating users, types of transactions, amounts of transactions, dates of transactions, times of transactions, and the like, may be used to train the one or more machine learning models. The one or more machine learning models may be executed (e.g., using subsequently received data as inputs) to generate an output including one or more expected user patterns. The expected user patterns may include data associated with expected payments or transactions, expected locations of a user or user transactions, expected timing of payments or transactions, and the like. For instance, the machine learning model may be executed to generate an expected pattern that a user will make a $1500 payment on the first of the month to entity 1. In some examples, if the user makes the payment of $1500 on the first of the month to entity 1, the system may recognize that there is a low likelihood of unauthorized activity. However, if the user typically uses account 1 for the payment but this month used account 2, the system may still recognize that there is a low likelihood of unauthorized activity. Accordingly, the user patterns may be by user rather than by account of the user. This provides a more wholistic approach to unauthorized activity detection, user authentication and transaction authorization, and the like.

In some examples, the machine learning model may be executed to generate one or more expected user patterns on a continuous basis, on a periodic basis, upon detecting at least a threshold number of transactions outside of an expected pattern, or the like. Accordingly, the system may continually receive data that is used to validate or update the machine learning model and generate more accurate expected user patterns that may change frequently based on recently received data. For instance, recent purchase data (e.g., within a last day, week, month or the like) may be used to generate expected user patterns that may include patterns outside a norm for a user to account for recent changes, or the like (e.g., may indicate travel, a change of job, a new working location, or the like).

Frictionless authentication computing platform 110 may further have, store and/or include geo-location module 112d. Geo-location module 112d may store instructions and/or data that may cause or enable the frictionless authentication computing platform 110 to request and/or receive geo-location data from one or more user computing devices, such as user computing device 170, user computing device 175, or the like. In some examples, in response to a request to process a transaction, the frictionless authentication computing platform 110 may request geo-location data from a user device to evaluate the location of the user to determine whether the user is within an expected location pattern. In some examples, the expected location pattern may be based on recent purchase data (e.g., a plane ticket was purchased and a rental car was reserved in Las Vegas so a user expected location may include Las Vegas, even if the user lives in Toledo and rarely travels).

Frictionless authentication computing platform 110 may further have, store and/or include authentication module 112e. Authentication module 112e may store instructions and/or data that may cause or enable the frictionless authentication computing platform 110 to receive a transaction request and compare the transaction request to generated expected user patterns to authenticate the user, authorize the transaction, or the like. For instance, the received transaction request and, in some examples, received geo-location data, may be compared to expected user patterns to determine whether the transaction falls within an expected pattern (e.g., is in a location that is expected, is at an expected merchant, is for an expected amount, or the like). If not, unauthorized activity may be occurring and a notification may be generated and transmitted to a user. In some examples, the system may determine a type of authentication output generated (e.g., unauthorized activity (e.g., high confidence or likelihood based on variance from pattern), potential unauthorized activity (e.g., medium confidence or likelihood based on variance from pattern), authentication and authorization approved, or the like).

Frictionless authentication computing platform 110 may further have, store and/or include notification generation module 112*f*. Notification generation module 112*f* may store instructions and/or data that may cause or enable the frictionless authentication computing platform 110 to generate and transmit one or more notifications to a user device based on the authentication output. In some examples, the type of notification generated may be based on the type of authentication output. For instance, a high confidence of unauthorized activity may prevent the transaction from being processed and may notify the user of the activity. In another example, a medium likelihood of unauthorized activity may pause processing of the transaction and request user input confirming that the user is requesting the transaction and that it is not an unauthorized actor, or the like.

Frictionless authentication computing platform 110 may further have, store and/or include a database 112*g*. Database 112*g* may store data associated with transaction requests, expected user patterns generated by the machine learning model, authentication outputs, and the like.

FIGS. 2A-2G depict one example illustrative event sequence for implementing and using frictionless authentication functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
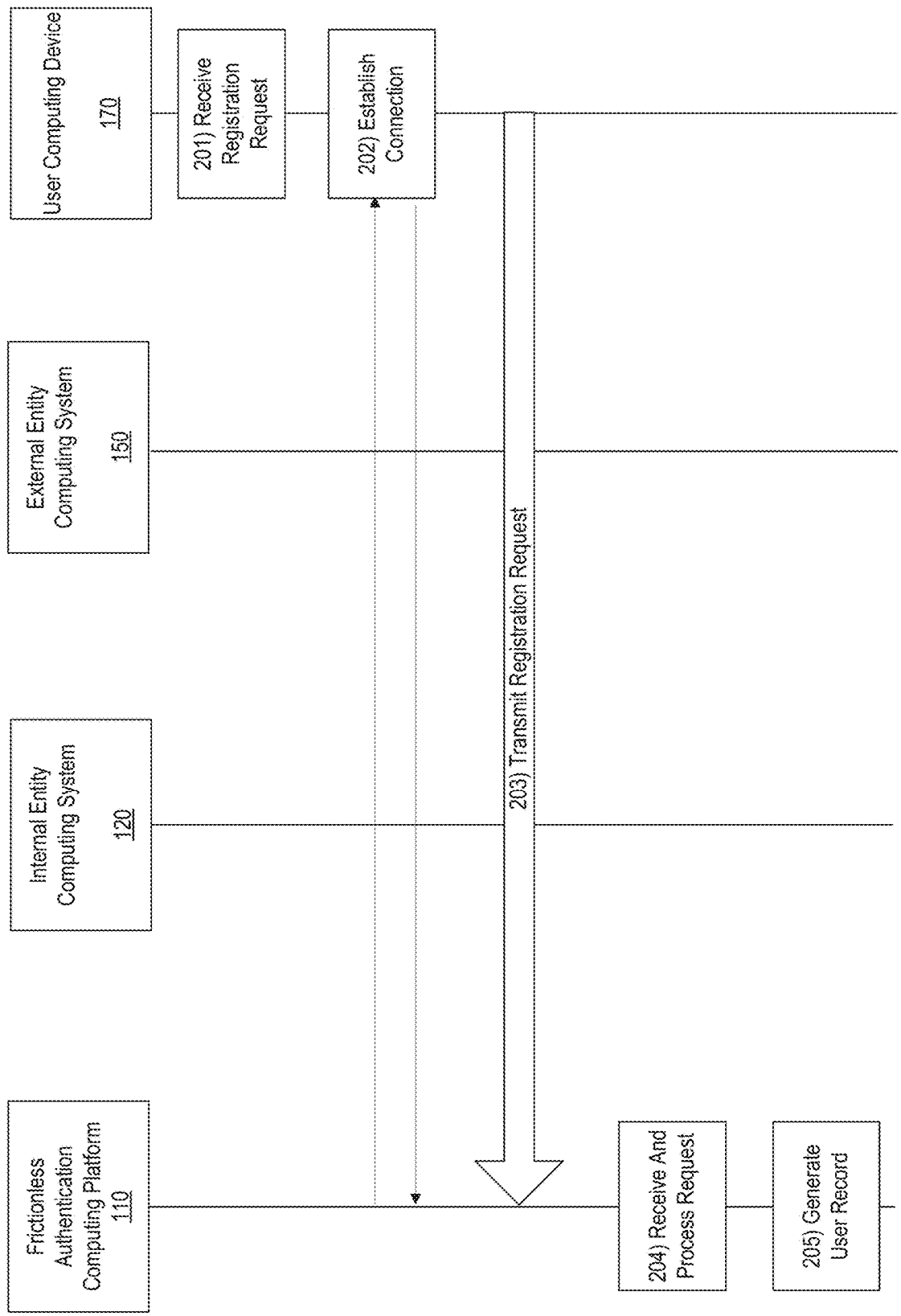
FIGS. 2A-2G depict an illustrative event sequence for implementing frictionless authentication functions in accordance with one or more aspects described herein.

With reference to FIG. 2A, at step 201, a registration request may be received by, for instance, user computing device 170. For instance, a user may input a request to register for frictionless authentication into the user computing device 170 (e.g., via a touchscreen, keypad, or the like) and via an application executing on the user computing device 170 (e.g., an application associated with the enterprise organization such as a mobile banking application, online banking application, or the like). In some examples, the registration request may include user identifying data, user computing device 170 identifying data, user account data, or the like. In some arrangements, registration data may include user authentication data that may be pre-stored and used if frictionless authentication functions are unavailable, if additional authentication data is requested, or the like. In some examples, registration data may include user permissions, preferences, and the like.

At step 202, user computing device 170 may connect to frictionless authentication computing platform 110. For instance, a first wireless connection may be established between the user computing device 170 and the frictionless authentication computing platform 110. Upon establishing the first wireless connection, a communication session may be initiated between user computing device 170 and the frictionless authentication computing platform 110.

At step 203, user computing device 170 may transmit or send the request for registration, and registration data, to the frictionless authentication computing platform 110. For instance, the request for registration and registration data may be transmitted during the communication session initiated upon establishing the first wireless connection.

At step 204, frictionless authentication computing platform 110 may receive the registration request and may process the request. For instance, frictionless authentication computing platform 110 may evaluate the received data to determine whether additional data should be requested, or the like.

At step 205, frictionless authentication computing platform 110 may generate a user record. For instance, a database may be updated or modified to include a user record associated with the user requesting registration.

Figure 2B:
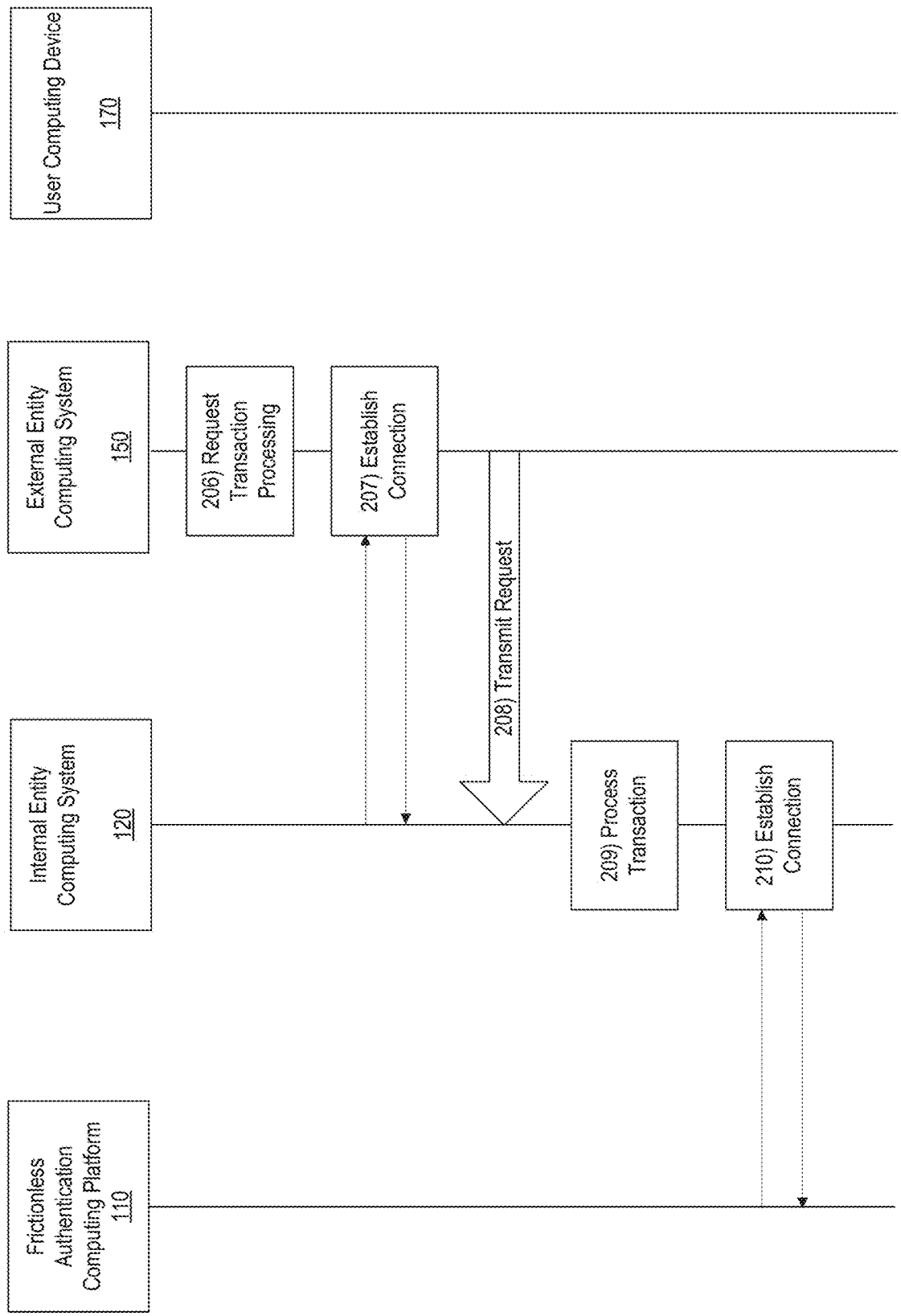

With reference to FIG. 2B, at step 206, external entity computing system 150 may receive a request to process a transaction. For instance, a user may initiate a transaction at a merchant POS, online via a merchant website, or the like, using, for instance, a payment device such as a credit or debit card, a mobile payment application, wearable device, or the like.

At step 207, external entity computing system 150 may connect to internal entity computing system 120. For instance, a second wireless connection may be established between the external entity computing system 150 and internal entity computing system 120. Upon establishing the second wireless connection, a communication session may be initiated between external entity computing system 150 and internal entity computing system 120.

At step 208, external entity computing system 150 may transmit or send the request to process the transaction and transaction details to the internal entity computing system 120. For instance, the request to process the transaction and associated transaction details (e.g., merchant, user, account, amount, type, time, date, location, and the like) may be transmitted or sent during the communication session initiated upon establishing the second wireless connection.

At step 209, the internal entity computing system 120 may receive and process the request to process the transaction. For instance, the internal entity computing system 120 may receive the request to process the transaction, confirm transaction details (e.g., card is valid, balance in an account is sufficient, and the like), and process and/or authorize the transaction. In some examples, in processing the transaction, the user may be prompted to provide authenticating data (e.g., personal identification number, or the like). Additionally or alternatively, the system may evaluate the requested transaction for unauthorized activity and, if unauthorized activity is likely, the system may prevent processing of the transaction, notify the user, or the like.

At step 210, internal entity computing system 120 may connect to frictionless authentication computing platform 110. For instance, a third wireless connection may be established between the internal entity computing system 120 and frictionless authentication computing platform 110. Upon establishing the third wireless connection, a communication session may be initiated between internal entity computing system 120 and frictionless authentication computing platform 110.

Figure 2C:
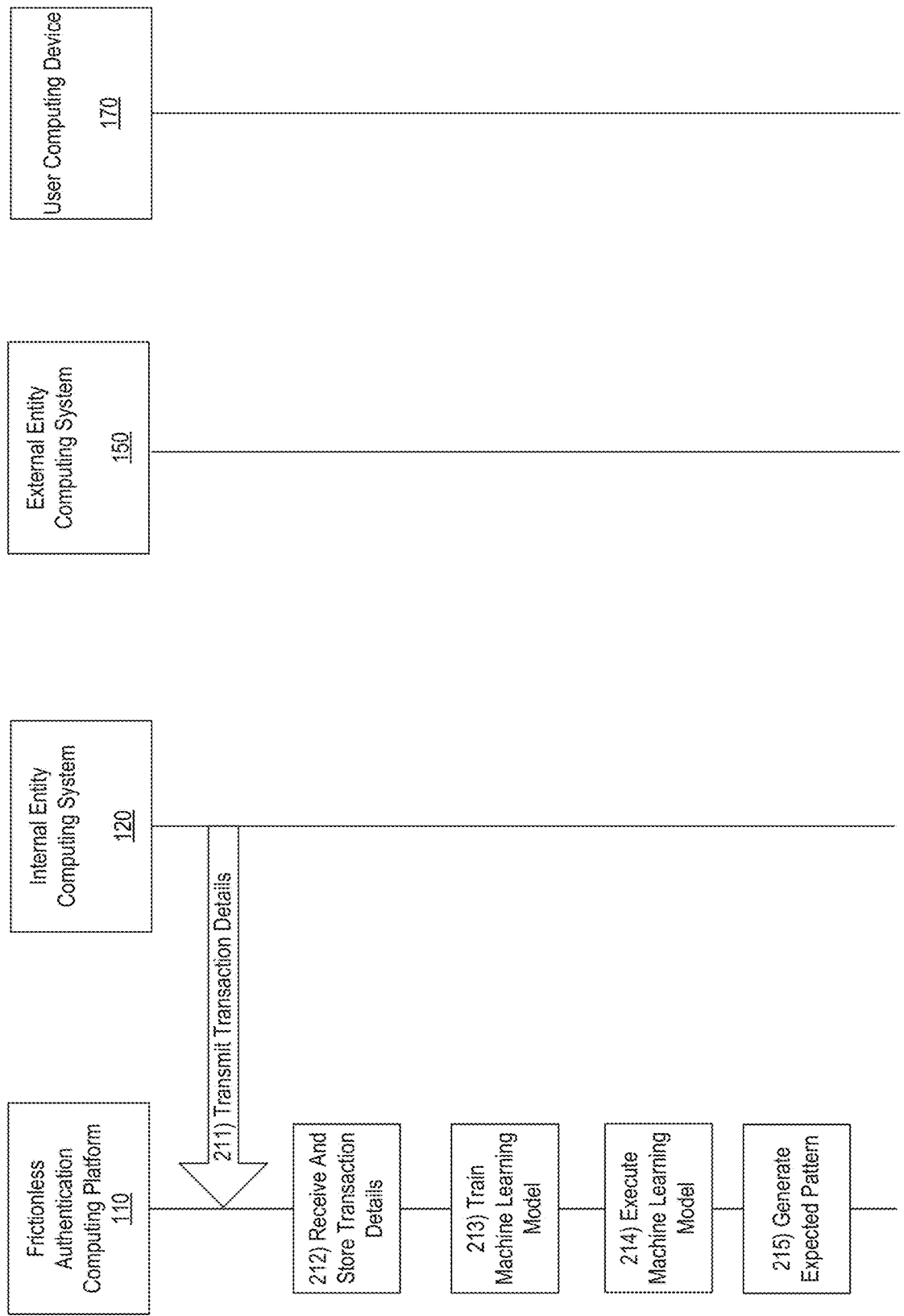

With reference to FIG. 2C, at step 211, internal entity computing system 120 may transmit or send transaction details to the frictionless authentication computing platform 110. For instance, transaction details such as user, amount, whether the transaction was processed or denied, merchant, type, location, and the like, may be transmitted by the internal entity computing system 120 to the frictionless authentication computing platform 110 during the communication session initiated upon establishing the third wireless connection.

At step 212, the frictionless authentication computing platform 110 may receive and store the transaction details (e.g., in a database with, for instance, other historical transaction data).

At step 213, frictionless authentication computing platform 110 may train one or more machine learning models. For instance, frictionless authentication computing platform 110 may train one or more machine learning models using historical data including, for instance, the transaction data received at step 212. In some examples, frictionless authentication computing platform 110 may input labeled data into one or more machine learning models to train the one or more machine learning models (e.g., using one or more supervised learning techniques) to output one or more expected user patterns. For instance, historical parameters (e.g., type of transaction, amount, location, category of goods purchased, or the like) may be labeled with a corresponding outcome (e.g., whether the transaction was processed, whether unauthorized activity was detected, and the like). The machine learning model may then process this information to generated one or more expected user pattern.

At step 214, the machine learning model may be executed to generate or output one or more expected user patterns (e.g., for one or more particular registered users) and, at step 215, the one or more expected user patterns may be generated. In some examples, the machine learning model may generate or output one or more expected user patterns on a continuous or near continuous basis (e.g., the model may be constantly updating, generating new patterns, and the like). Additionally or alternatively, the model may be triggered to execute and generate one or more expected user patterns on a periodic or scheduled basis, upon receive of additional transaction details (e.g., upon receiving transaction details as in step 212), upon detecting increased transaction activity (e.g., more than a threshold or expected number of transactions), upon detection of a new category of item purchase (e.g., purchases outside expected categories), upon detection of a type of transaction or purchase (e.g., a plane ticket or rental car reservation may indicate expect travel to a new location and a new expected pattern should be generated), or the like. Various other triggers to execute the model and generate one or more expected patterns may be used without departing from the invention.

Figure 2D:
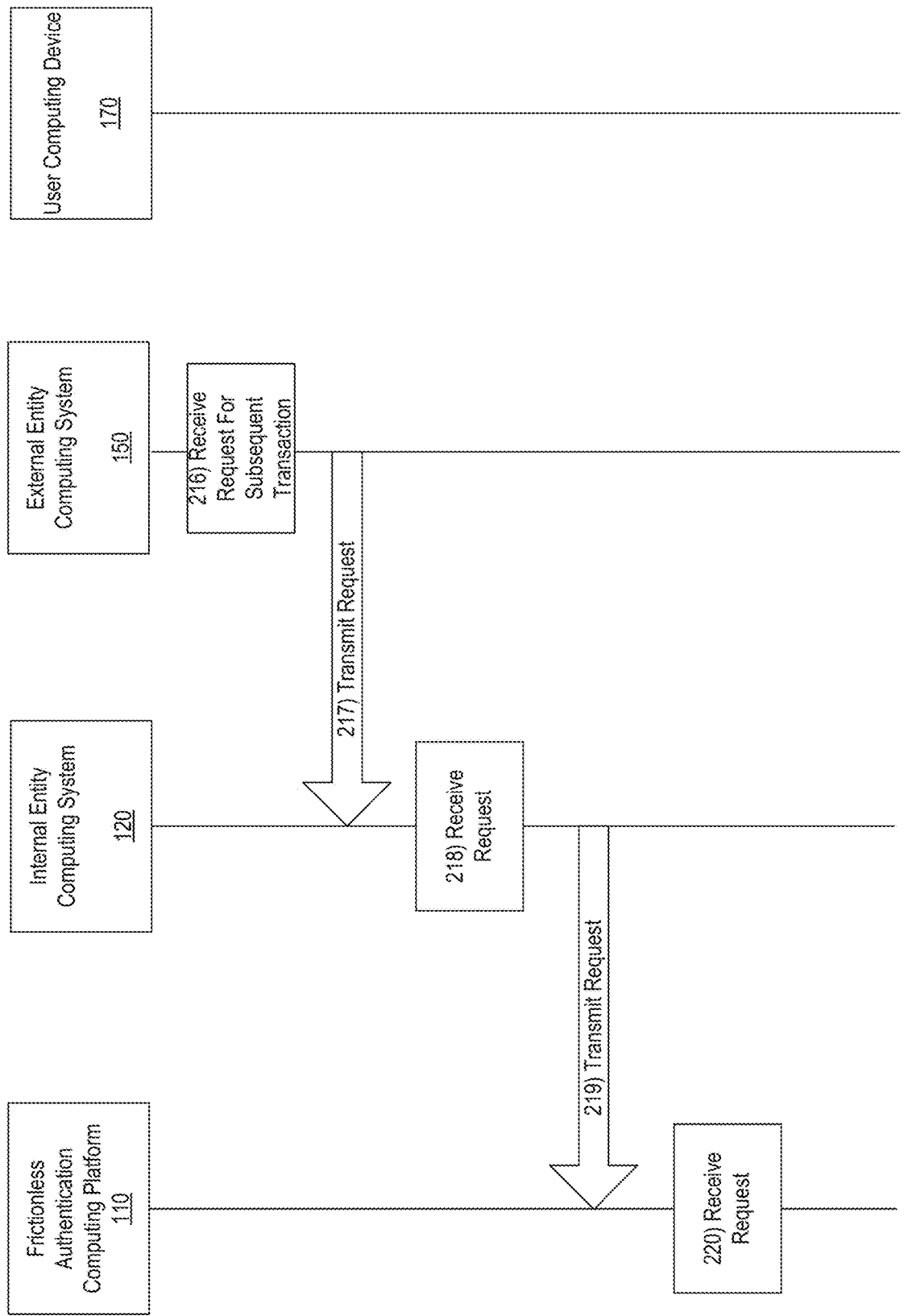

With reference to FIG. 2D, at step 216, external entity computing system 150 may receive a request for a subsequent transaction (e.g., after one or more transactions used to train the machine learning model). The request to process the transaction may include transaction details including user, account, type of transaction, amount of transaction, and the like.

At step 217, external entity computing system 150 may transmit or send the request to process the subsequent transaction to the internal entity computing system 120 for evaluation and processing.

At step 218, internal entity computing system may receive the request to process the subsequent transaction.

At step 219, internal entity computing system 120 may transmit or send the request to process the subsequent transaction and transaction details to frictionless authentication computing platform 110. For instance, the request to process the subsequent transaction and transaction details may be sent to frictionless authentication computing platform for evaluation for unauthorized activity, user authentication, transaction approval, and the like.

At step 220, the request to process the subsequent transaction may be received by frictionless authentication computing platform 110.

Figure 2E:
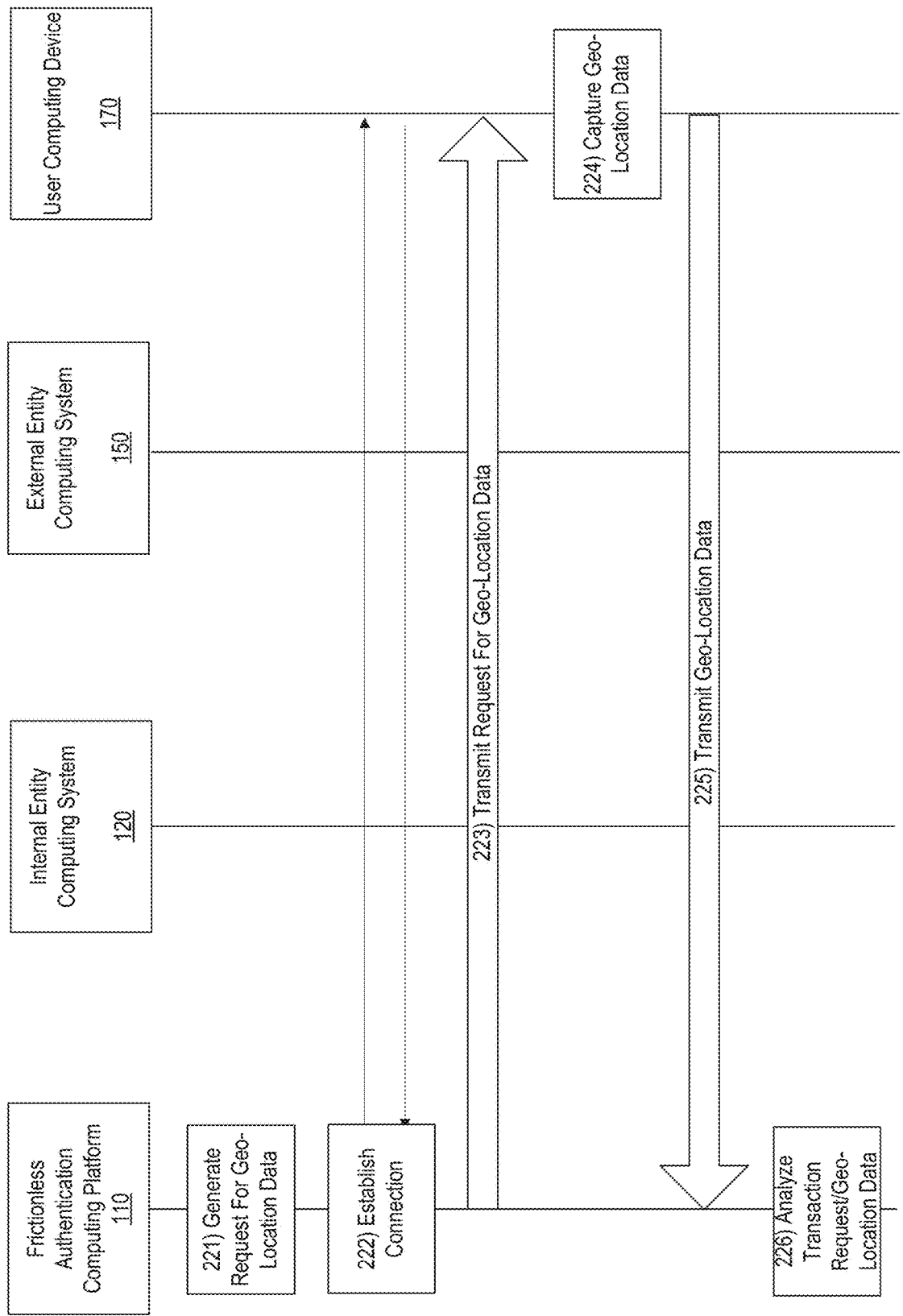

With reference to FIG. 2E, at step 221, frictionless authentication computing platform 110 may generate a request for geo-location data of a user or user device. For instance, frictionless authentication computing platform 110 may generate a request for current location data associated with a registered user device of a registered user, such as user computing device 170.

At step 222, frictionless authentication computing platform 110 may connect to user computing device 170. For instance, a fourth wireless connection may be established between the frictionless authentication computing platform 110 and user computing device 170. Upon establishing the fourth wireless connection, a communication session may be initiated between frictionless authentication computing platform 110 and user computing device 170.

At step 223, frictionless authentication computing platform 110 may transmit or send the request for geo-location data to user computing device 170. For instance, the request for geo-location data may be transmitted or sent during the communication session initiated upon establishing the fourth wireless connection.

At step 224, user computing device 170 may receive and execute the request for geo-location data and may capture the requested geo-location data. For instance, user computing device 170 may capture current geo-location data based on a GPS associated with the user computing device 170. In some examples, capturing current geo-location data may include capturing location data over a range of time based on the request for geo-location data, predetermined settings, or the like. For instance, in some examples, capturing current geo-location data may include capturing geo-location data captured by the user computing device 170 over the last one hour, eight hours, 24 hours, or the like.

At step 225, the geo-location data may be transmitted by the user computing device 170 to the frictionless authentication computing platform 110.

At step 226, frictionless authentication computing platform may receive the geo-location data and analyze the geo-location data and received request for subsequent transaction. For instance, frictionless authentication computing platform 110 may compare the received geo-location data and transaction details or data to determine whether it falls within one or more generated expected user patterns. If so, it may be determined that unauthorized activity is not occurring or not likely occurring, that the user is authenticated and the transaction may be authorized. If not, depending on the analysis, a determination of unauthorized activity, potential unauthorized activity, request for additional authentication data, or the like, may be determined.

Figure 2F:
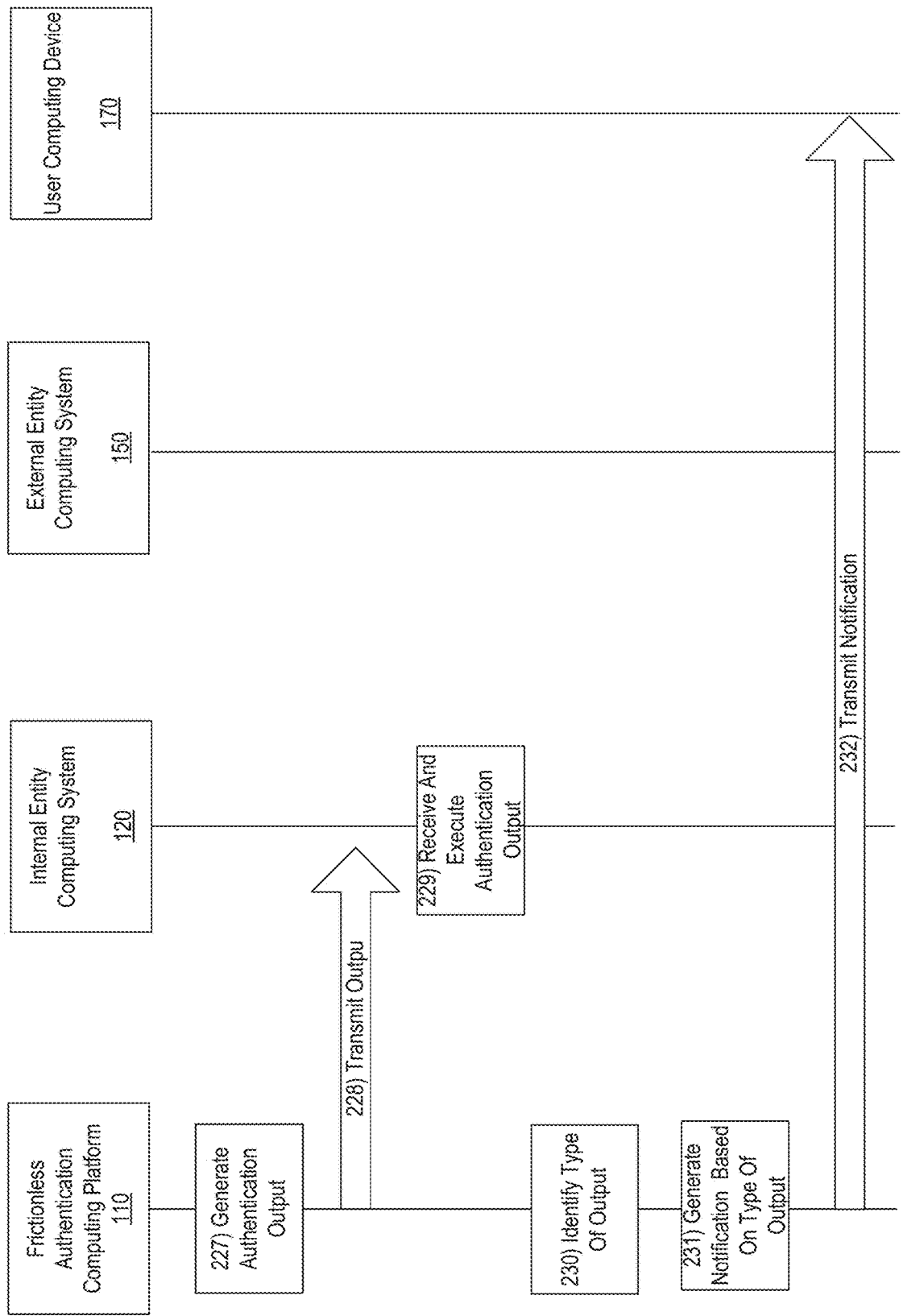

With reference to FIG. 2F, at step 227, based on the analysis at step 226, an authentication output may be generated. For instance, if the data falls within an expected user pattern, the authentication output may indicate that the user is authenticated and the transaction may be processed. If not, an authentication output indicating unauthorized activity, potential unauthorized activity, or the like, may be generated.

At step 228, the authentication output may be transmitted to the internal entity computing system 120 for processing. For instance, the authentication output may be transmitted to internal entity computing system 120 to authorize and process the transaction, prevent transaction processing, or the like.

At step 229, the internal entity computing system 120 may receive and execute the authentication output. For instance, the internal entity computing system 120 may receive and execute the authentication output to process the transaction, prevent transaction processing, or the like.

At step 230, a type of authentication output may be determined. For instance, in some examples, a type of authentication output, such as "authenticated," "unauthorized activity," "potential unauthorized activity," or the like, may be identified. In some examples, the type of authentication output may be based on a confidence level associated with the analysis of whether the data falls within the expected user pattern, whether the data is an outlier within the expected pattern, whether the data is well outside the expected pattern, or the like.

At step 231, frictionless authentication computing platform 110 may generate a notification. In some example, the type of notification may be generated based on a type of authentication output. For instance, if the authentication output indicates the user is authenticated, a notification indicating authentication and transaction processing may be generated. In another example, if the authentication output is unauthorized activity, a notification requesting user input before processing the transaction may be requested. In yet another example, if the authentication output indicates a potential for unauthorized activity, the notification may indicate that the transaction has been authorized but the user is being made aware because of potential unauthorized activity. Various other notifications may be generated without departing from the invention.

At step 232, the frictionless authentication computing platform 110 may transmit the notification to the user computing device 170. In some examples, transmitting the notification may cause the notification to be displayed on a display of user computing device.

Figure 2G:
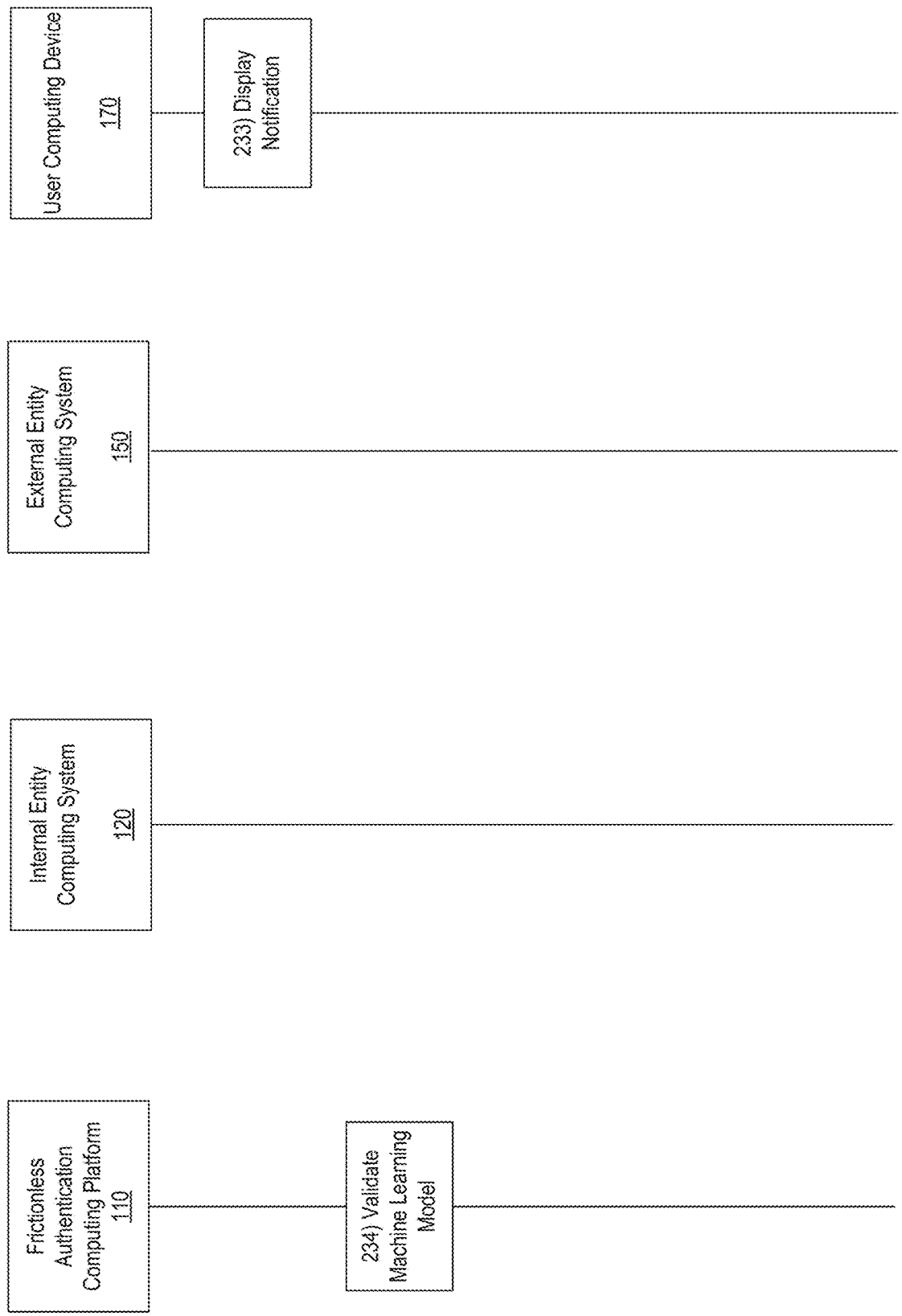

With reference to FIG. 2G, at step 233, user computing device 170 may receive and display the notification.

At step 234, frictionless authentication computing platform 110 may update and/or validate the one or more machine learning models based on the analyzed/processed subsequent transaction. Accordingly, the machine learning models may be continuously updated and accuracy of predictions improved. In some examples, updating and/or validating the one or more machine learning models may cause execution of the one or more machine learning models to generate or output new or additional expected user patterns (e.g., for the user associated with the subsequent transaction).

Figure 3:
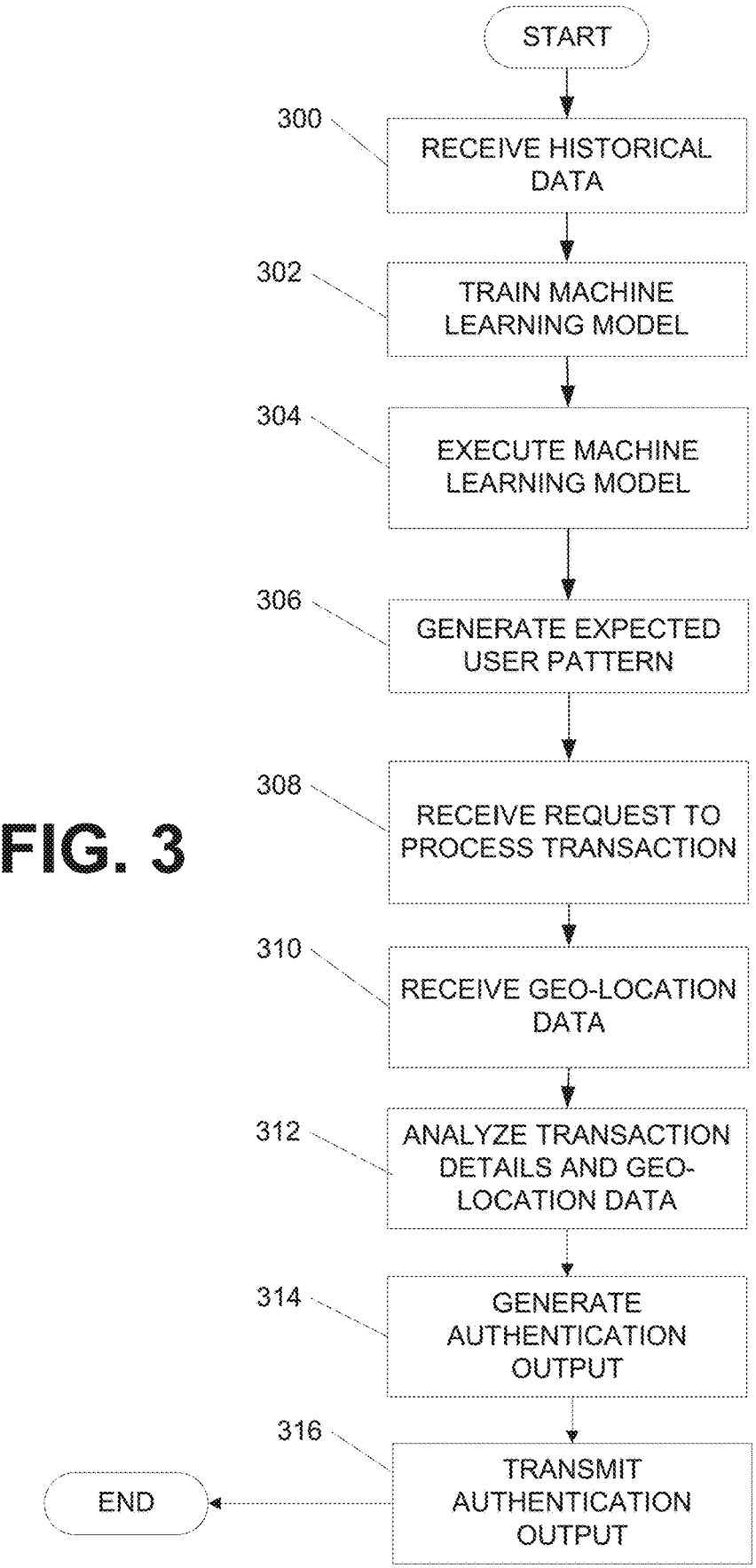
FIG. 3 illustrates an illustrative method for implementing frictionless authentication functions according to one or more aspects described herein.

FIG. 3 is a flow chart illustrating one example method of implementing frictionless authentication functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, historical data may be received. For instance, historical transaction or other data associated with a plurality of users including a first user may be received. In some examples, the historical data may include transaction details such as merchant, amount, account used, type of transaction, items purchased, location, and the like.

At step 302, the historical data may be used to train a machine learning model. For instance, a machine learning model may be trained using, for example, labeled datasets.

At step 304, the machine learning model may be executed. Executing the machine learning model may generate or output one or more expected user patterns at step 306.

At step 308, a request to process a transaction may be received. For instance, a user may request transaction processing. The request may include transaction details such as type, amount, user, merchant, location, and the like.

At step 310, geo-location data associated with a current location of a user computing device associated with the user may be received. For instance, GPS data from the user computing device may be received.

At step 312, the received transaction details and geo-location data may be analyzed by comparing the details and geo-location data to the one or more expected user patterns. The analysis may indicate whether the transaction details and geo-location data fall within an expected user pattern. In some examples, machine learning may be used to analyze the transaction details and geo-location data.

At step 314, based on the analyzing, an authentication output may be generated. For instance, an authentication output indicating whether there is unauthorized activity, potential unauthorized activity, whether the user is authenticated and the transaction authorized for processing, and the like, may be generated.

At step 316, the authentication output may be transmitted or sent to one or more computing devices or systems. For instance, the authentication output may be transmitted to an internal computing system and may cause the internal entity computing system to process the transaction, prevent transaction processing, or the like.

Figure 4:
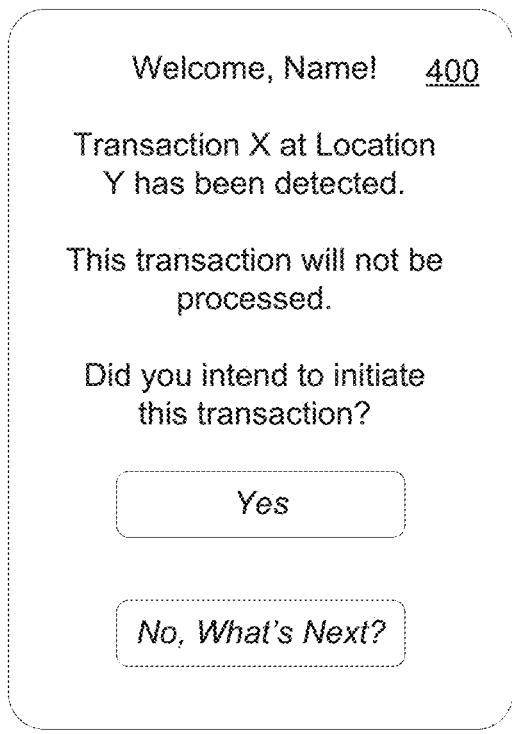
FIGS. 4 and 5 illustrate example user interfaces that may be generated in accordance with one or more aspects described herein.

FIG. 4 illustrates one example notification that may be generated in accordance with one or more aspects described herein. The notification includes user interface 400 that may include details of a requested transaction and an indication that the transaction will not be processed (e.g., because unauthorized activity has been detected based on the analysis of the transaction details and expected user patterns). In addition, the user interface 400 includes options for the user to indicate that they did request this transaction (e.g., no unauthorized activity) or that they did not request the transaction, thereby confirming unauthorized activity. Based on user selection of one of the options, the user response data may be transmitted to frictionless authentication computing platform and the machine learning model may be updated or validated based on the response data.

Figure 5:
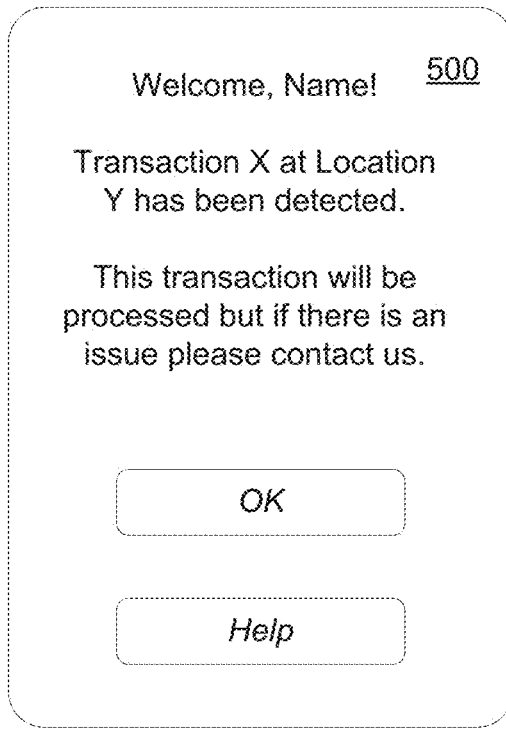

FIG. 5 illustrates another example notification that may be generated in accordance with one or more aspects described herein. The notification includes a user interface 500 indicating that the transaction will be processed (e.g., there is the possibility of unauthorized activity but not sufficient possibility to prevent processing of the transaction (e.g., low confidence)) but providing options for the user to contact the enterprise organization for assistance to accept the processing. Any user response may be transmitted to frictionless authentication computing platform 110 to update or validate the machine learning model.

Accordingly, aspects described herein are directed to frictionless authentication of users and authorization of transactions. For instance, by using machine learning and current geo-location data of a user computing device, the system may predict expected patterns for one or more users and may determine, with little or no input from the user, whether a requested transaction includes unauthorized activity or likely unauthorized activity, whether the user is an expected user (e.g., authenticated) and/or whether to authorize the transaction.

For instance, conventional systems of unauthorized activity detection, user authentication, or the like, may rely on searching for previous data to validate a requested transaction. However, this may be time consuming and inefficient. Accordingly, arrangements described herein proactively generate expected user patterns that may be compared to current transaction details and geo-location data to evaluate a transaction for unauthorized activity, authenticate a user, or the like.

For example, a particular user may rarely travel. However, recent transaction data reflects purchases at outdoor stores, ski shops, and the like. Based on those purchase, the system may generate an expected user pattern that includes outdoor sports such as skiing. Accordingly, when a requested transaction is identified in Colorado, the system may detect user geo-location data in Colorado and determine, based on the expected pattern of outdoor sports and/or skiing, that there is no unauthorized activity.

Accordingly, while user data may be used to establish a baseline pattern, aspects described herein enable frequent generation of expected patterns to account for a changing baseline. For instance, for a user who travels often, their baseline may change frequently. Arrangements described herein that rely on machine learning models to generate expected user patterns can quickly adapt (e.g., adapt expected transaction data) to the changing patterns of the user. The system may continuously or near-continuously generated expected user patterns to accommodate frequent changes in user activity.

Further, arrangements described herein enable determining predicted patterns of a user, rather than based on an account of a user. Accordingly, if a user uses a different account for an expected payment, conventional systems may flag that as an issue. However, the arrangements described herein have a more wholistic view of the user patterns and, accordingly, would know that the payment is not unauthorized activity.

Although aspects described herein include use of geo-location data in evaluating transaction requests, in some examples, a user computing device identifier may be used as a point of authentication. For instance, if a user requests a transaction via a user computing device (e.g., via phone channel, mobile application, or the like), the system may detect a user computing device identifier from which the request is made and confirm that that user device identifier has been registered with the user. If not, additional authentication data may be requested. In some examples, data from, for instance, a wireless carrier may be used to evaluate authentication, unauthorized activity, or the like (e.g., with permission of the user).

Although aspects described herein include receiving data from various sources that include, for instance, internal entity computing systems, in some examples, data may be received from one or more external sources as well (e.g., with permission of the user). For instance, purchase data made outside of the enterprise organization, publicly available data, and the like, may be received from one or more external data sources and used to, for instance, train the machine learning model.

The arrangements described may vastly reduce or even eliminate a number of false positive identifications of unauthorized activity. For instance, by using a machine learning model that is validated and/or updated frequently (e.g., based on user activity, on a predetermined schedule, or the like) the system accurately learns user patterns and can accurately identify transactions or occurrences that are outside of those patterns. Accordingly, interruption to user functionality may be limited to actual occurrences of unauthorized activity or potential unauthorized activity.

In some examples, the machine learning model may learn when to generate or re-generate expected user patterns. For instance, for users who remain in a same or similar location, who make purchases from a same or similar merchant and/or who have regular patterns of usage, the model may learn to generate or re-generate expected user patterns on a first schedule (e.g., less frequently) than a user who is often changing locations, makes generally unpredictable purchases, or the like, who may have patterns generated or re-generated on a second schedule (e.g., more frequently). Accordingly, this may reduce computational workload associated with executing the machine learning model to generate or re-generate expected user patterns.

Aspects described herein may be provided via an application executing on a user computing device. For instance, aspects described herein may be provided via a mobile application associated with the enterprise organization (e.g., a mobile banking application) executing on a mobile device of a user. The user may register, provide permissions, select options for customization, receive notifications, and the like, via the mobile application.

In some examples, aspects described herein may be used to identify entities often associated with unauthorized activity and notify a user before processing a transaction. For instance, entities known for unauthorized activity or potential unauthorized activity, browsers being used that are known to be associated with unauthorized actors, or the like, may be identified from previous data, from external data sources identifying cyber threats, or the like. This data may be used in training the machine learning model and may be used notify a user if a transaction request with one of the identified entities is received.

Although aspects described herein are generally described in the context of transaction processing, arrangements described herein may be used in various types event or transaction processing. For instance, account opening or closing, credit card opening or closing, and the like, may be analyzed using one or more arrangements described herein.

In some arrangements, each transaction detail or parameter may be evaluated to determine whether it falls within an expected pattern. Accordingly, in some arrangements, at least a threshold number of parameters may fall outside of an expected pattern before unauthorized activity is flagged. For instance, if a transaction is associated with an expected merchant, on an expected date but is made from a location that is not expected, no unauthorized activity may be detected. However, if an amount is also outside an expected amount, the two parameters being outside the pattern may indicated unauthorized activity.

Figure 6:
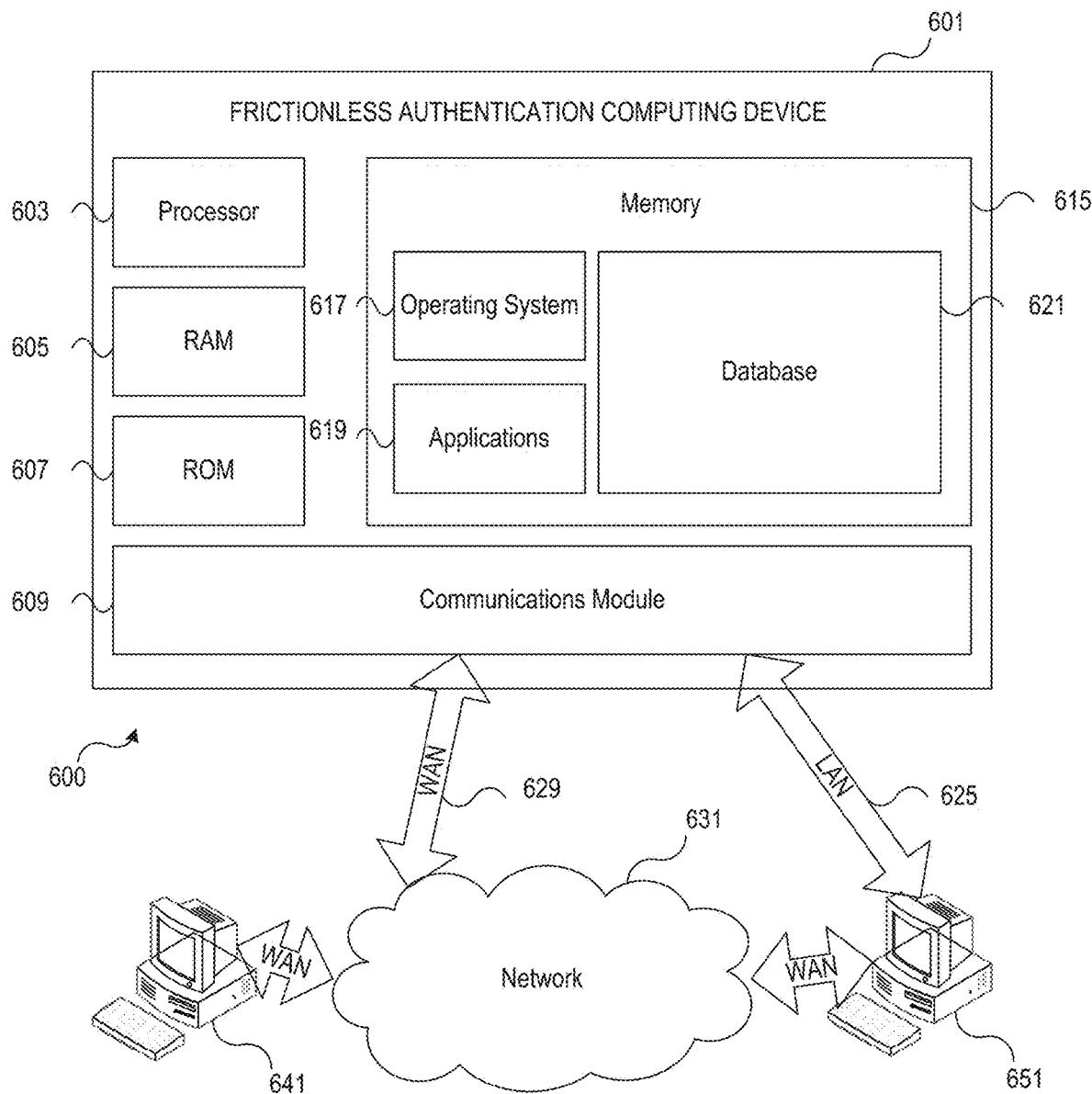
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include frictionless authentication computing device 601 having processor 603 for controlling overall operation of frictionless authentication computing device 601 and its associated components, including Random Access Memory (RAM) 605, Read-Only Memory (ROM) 607, communications module 609, and memory 615. Frictionless authentication computing device 601 may include a variety of computer readable media. Computer readable media may be any available media that may be accessed by frictionless authentication computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by frictionless authentication computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on frictionless authentication computing device 601. Such a processor may execute computer-executable instructions stored on a computer-readable medium.

Software may be stored within memory 615 and/or storage to provide instructions to processor 603 for enabling frictionless authentication computing device 601 to perform various functions as discussed herein. For example, memory 615 may store software used by frictionless authentication computing device 601, such as operating system 617, application programs 619, and associated database 621. Also, some or all of the computer executable instructions for frictionless authentication computing device 601 may be embodied in hardware or firmware. Although not shown, RAM 605 may include one or more applications representing the application data stored in RAM 605 while frictionless authentication computing device 601 is on and corresponding software applications (e.g., software tasks) are running on frictionless authentication computing device 601.

Communications module 609 may include a microphone, keypad, touch screen, and/or stylus through which a user of frictionless authentication computing device 601 may provide input, and may also include one or more of a speaker for providing audio output and a video display device for providing textual, audiovisual and/or graphical output. Computing system environment 600 may also include optical scanners (not shown).

Frictionless authentication computing device 601 may operate in a networked environment supporting connections to one or more remote computing devices, such as computing devices 641 and 651. Computing devices 641 and 651 may be personal computing devices or servers that include any or all of the elements described above relative to frictionless authentication computing device 601.

The network connections depicted in FIG. 6 may include Local Area Network (LAN) 625 and Wide Area Network (WAN) 629, as well as other networks. When used in a LAN networking environment, frictionless authentication computing device 601 may be connected to LAN 625 through a network interface or adapter in communications module 609. When used in a WAN networking environment, frictionless authentication computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive historical user data for a user;
        train a machine learning model using the received historical user data;
        in response to a triggering event associated with transaction activity of the user, execute the machine learning model to generate one or more expected user patterns for the user, wherein the one or more expected user patterns for the user predict patterns of user behavior that are different from historical behavior of the user, wherein the triggering event corresponds to a schedule for generating the one or more expected user patterns that is based on a number of changes of location of the user;
        after generating the one or more expected user patterns for the user, receive a request to process a transaction, the request to process the transaction including transaction details;
        receive, from a user computing device of the user, geo-location data of the user computing device, wherein the geo-location data includes data captured over a range of time;
        analyze the request to process the transaction including the transaction details and the geo-location data of the user computing device including comparing the transaction details and geo-location data to determine whether the transaction details and geo-location data fall within at least one of the one or more expected user patterns;
        generate, based on the analyzing, an authentication output, the authentication output indicating an output of the comparing; and
        transmit the authentication output, wherein transmitting the authentication output causes the authentication output to be displayed.

2. The computing platform of claim 1, wherein the historical user data includes historical transaction data.

3. The computing platform of claim 1, wherein the authentication output includes an indication of whether unauthorized activity is occurring.

4. The computing platform of claim 1, wherein the geo-location data is captured by a global positioning system of the user computing device.

5. The computing platform of claim 1, further including instructions that, when executed, cause the computing platform to:
    identify a type of authentication output; and
    generate a notification based on the identified type of authentication output.

6. The computing platform of claim 5, further including instructions that, when executed, cause the computing platform to:
    transmit the notification to the user computing device, wherein transmitting the notification causes the notification to display on the user computing device.

7. The computing platform of claim 1, wherein training the machine learning model using the received historical user data includes training the machine learning model using labeled datasets.

8. A method, comprising:
    receiving, by a computing platform, the computing platform having at least one processor and memory, historical user data for a user;
    training, by the at least one processor, a machine learning model using the received historical user data;
    in response to a triggering event associated with transaction activity of the user, executing, by the at least one processor, the machine learning model to generate one or more expected user patterns for the user, wherein the one or more expected user patterns for the user predict patterns of user behavior that are different from historical behavior of the user, wherein the triggering event corresponds to a schedule for generating the one or more expected user patterns that is based on a number of changes of location of the user;
    after generating the one or more expected user patterns for the user, receiving, by the at least one processor, a request to process a transaction, the request to process the transaction including transaction details;
    receiving, by the at least one processor and from a user computing device of the user, geo-location data of the user computing device, wherein the geo-location data includes data captured over a range of time;
    analyzing, by the at least one processor, the request to process the transaction including the transaction details and the geo-location data of the user computing device including comparing the transaction details and geo-location data to determine whether the transaction details and geo-location data fall within at least one of the one or more expected user patterns;

generating, by the at least one processor and based on the analyzing, an authentication output, the authentication output indicating an output of the comparing; and transmitting, by the at least one processor, the authentication output, wherein transmitting the authentication output causes the authentication output to be displayed.

9. The method of claim 8 wherein the historical user data includes historical transaction data.

10. The method of claim 8, wherein the authentication output includes an indication of whether unauthorized activity is occurring.

11. The method of claim 8, wherein the geo-location data is captured by a global positioning system of the user computing device.

12. The method of claim 8, further including:
identifying, by the at least one processor, a type of authentication output; and
generating, by the at least one processor, a notification based on the identified type of authentication output.

13. The method of claim 12, further including:
transmitting, by the at least one processor, the notification to the user computing device, wherein transmitting the notification causes the notification to display on the user computing device.

14. The method of claim 8, wherein training the machine learning model using the received historical user data includes training the machine learning model using labeled datasets.

15. One or more non-transitory computer-readable media storing instructions that, when executed by a computing platform comprising at least one processor, memory, and a communication interface, cause the computing platform to:
receive historical user data for a user;
train a machine learning model using the received historical user data;
in response to a triggering event associated with transaction activity of the user, execute the machine learning model to generate one or more expected user patterns for the user, wherein the one or more expected user patterns for the user predict patterns of user behavior that are different from historical behavior of the user, wherein the triggering event corresponds to a schedule for generating the one or more expected user patterns that is based on a number of changes of location of the user;
after generating the one or more expected user patterns for the user, receive a request to process a transaction, the request to process the transaction including transaction details;
receive, from a user computing device of the user, geo-location data of the user computing device, wherein the geo-location data includes data captured over a range of time;
analyze the request to process the transaction including the transaction details and the geo-location data of the user computing device including comparing the transaction details and geo-location data to determine whether the transaction details and geo-location data fall within at least one of the one or more expected user patterns;
generate, based on the analyzing, an authentication output, the authentication output indicating an output of the comparing; and
transmit the authentication output, wherein transmitting the authentication output causes the authentication output to be displayed.

16. The one or more non-transitory computer-readable of claim 15, wherein the historical user data includes historical transaction data.

17. The one or more non-transitory computer-readable of claim 15, wherein the authentication output includes an indication of whether unauthorized activity is occurring.

18. The one or more non-transitory computer-readable of claim 15, wherein the geo-location data is captured by a global positioning system of the user computing device.

19. The one or more non-transitory computer-readable of claim 15, further including instructions that, when executed, cause the computing platform to:
identify a type of authentication output; and
generate a notification based on the identified type of authentication output.

20. The one or more non-transitory computer-readable of claim 19, further including instructions that, when executed, cause the computing platform to:
transmit the notification to the user computing device, wherein transmitting the notification causes the notification to display on the user computing device.

21. The one or more non-transitory computer-readable of claim 15, wherein training the machine learning model using the received historical user data includes training the machine learning model using labeled datasets.

* * * * *